(12) United States Patent
Ni

(10) Patent No.: US 8,738,161 B2
(45) Date of Patent: May 27, 2014

(54) MOBILE DEVICE AND METHOD FOR HELPING EXERCISING USING A MOBILE DEVICE

(75) Inventor: Yuan Ni, Shenzhen (CN)

(73) Assignees: Shenzhen Futaihong Precision Industry Co., Ltd., Shenzhen (CN); Chi Mei Communication Systems, Inc., New Taipei (TW)

(*) Notice: Subject to any disclaimer, the term of this patent is extended or adjusted under 35 U.S.C. 154(b) by 888 days.

(21) Appl. No.: 12/732,205

(22) Filed: Mar. 26, 2010

(65) Prior Publication Data
US 2011/0137440 A1    Jun. 9, 2011

(30) Foreign Application Priority Data
Dec. 4, 2009   (CN) .......................... 2009 1 0310929

(51) Int. Cl.
  *G06F 17/00*   (2006.01)
  *H04R 29/00*   (2006.01)
  *A63B 24/00*   (2006.01)
(52) U.S. Cl.
  USPC .................................. 700/94; 381/58; 482/4
(58) Field of Classification Search
  USPC ......... 700/94; 381/18, 310, 58; 340/669, 670;
                73/488, 514.01; 324/160–162; 482/1,
                482/3, 4, 6–9, 148
  See application file for complete search history.

(56) References Cited

U.S. PATENT DOCUMENTS

| 5,215,468 | A  | * | 6/1993  | Lauffer et al. | 434/236 |
| 5,696,952 | A  | * | 12/1997 | Pontarelli     | 713/600 |
| 8,290,186 | B2 | * | 10/2012 | Jung           | 381/311 |
| 2005/0126370 | A1 | * | 6/2005 | Takai et al.  | 84/636  |
| 2006/0015197 | A1 | * | 1/2006 | Gupta         | 700/94  |
| 2006/0107822 | A1 | * | 5/2006 | Bowen         | 84/612  |
| 2009/0205482 | A1 | * | 8/2009 | Shirai et al. | 84/612  |
| 2011/0093100 | A1 | * | 4/2011 | Ramsay        | 700/94  |

FOREIGN PATENT DOCUMENTS

| CN | 1968293   | 5/2007 |
| CN | 101394906 | 3/2009 |

* cited by examiner

*Primary Examiner* — Davetta W Goins
*Assistant Examiner* — Daniel Sellers
(74) *Attorney, Agent, or Firm* — Novak Druce Connolly Bove + Quigg LLP

(57) ABSTRACT

A mobile device and a method include setting a vibration intensity grade and activating a vibration sensor to detect vibration intensity of the mobile device. The mobile device and the method further include obtaining the output induced voltage amplitude, confirming a vibration intensity grade, and controlling a music adjuster to adjust a playing speed and a playing volume of a music player to the confirmed vibration intensity grade.

10 Claims, 3 Drawing Sheets

MOBILE DEVICE AND METHOD FOR HELPING EXERCISING USING A MOBILE DEVICE

BACKGROUND

1. Field of the Invention

Embodiments of the present disclosure are related to exercise, and in particular, to a mobile device and method for helping exercise using a mobile device.

2. Description of Related Art

Many people like to listening to music while exercising. However, with current technology, a user must manually manipulate a music player in order to adjust speed and volume of the music. As the user increases the intensity of his/her exercise, he/she must adjust the music play accordingly.

What is needed, therefore, is an improved mobile device and method to overcome the aforementioned problem.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
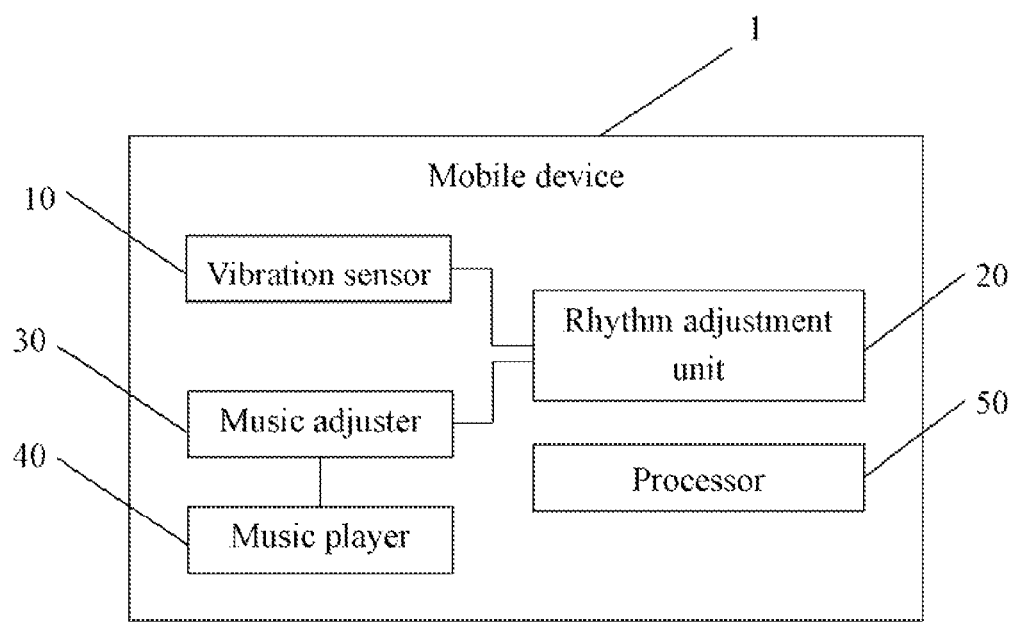
FIG. 1 is a block diagram of one embodiment of a mobile device including a rhythm adjustment unit.

FIG. 1 is a block diagram of one embodiment of a mobile device 1 including a rhythm adjustment unit 20. The mobile device 1 further includes a vibration sensor 10, a music adjuster 30, and a music player 40. In one embodiment, the rhythm adjustment unit 20 is used to adjust corresponding parameters (e.g., playing speed or playing volume) of the music player 40 according to a vibration intensity of the mobile device 1.

The vibration sensor 10 senses the vibration intensity of the mobile device 1. In one embodiment, the vibration sensor 10 may be a speed vibration sensor. The vibration sensor 10 receives a vibration signal of the mobile device 1, and calculates corresponding induced voltage amplitude. The induced voltage amplitude is proportional to the frequency and amplitude of the vibration signal. If the vibration intensity of the mobile device 1 is stronger, the induced voltage amplitude of the vibration sensor 10 is larger. If the vibration intensity of the mobile device 1 is smaller, the induced voltage amplitude is smaller.

The music player 40 plays music of the mobile device 1. In one embodiment, the music adjuster 30 may be multimedia hardware capable of supporting dynamic change in the music's rhythm and music's intensity. The music adjuster 30 may adjust the speed and volume of the music of the music player 40.

The mobile device 1 further includes a processor 50. The processor 50 executes one or more computerized operations of the mobile device 1 and other applications, to provide the functions of the mobile device 1.

Figure 2:
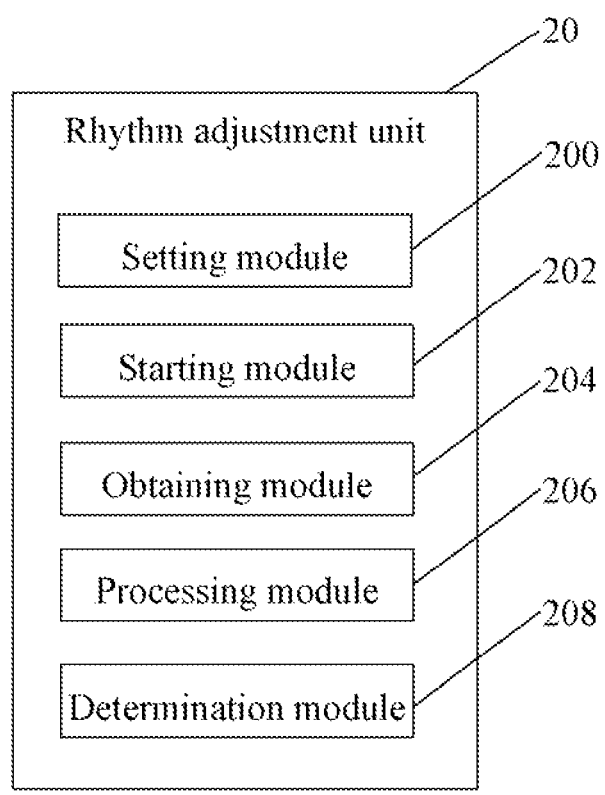
FIG. 2 is a block diagram of one embodiment of the rhythm adjustment unit of FIG. 1.

FIG. 2 is a block diagram of one embodiment of the rhythm adjustment unit 20 of FIG. 1. In one embodiment, the rhythm adjustment unit 20 comprises of a setting module 200, an activating module 202, an obtaining module 204, a processing module 206, and a determination module 208. The modules 200, 202, 204, 206, and 208 may comprise one or more computerized codes to be executed by the processor 50 to perform one or more operations of the mobile device 1. Details of these operations will be provided below.

The setting module 200 sets a plurality of induced voltage amplitudes of the vibration sensor 10, and sets a vibration intensity grade corresponding to each of the plurality of induced voltage amplitudes. In one embodiment, the vibration intensity grades may include a weak grade, a medium grade, and a strong grade. For example, a first range of the induced voltage amplitude can be 0V-0.9V, and the vibration intensity grade corresponding to the first range may be the weak grade. A second range of the induced voltage amplitude can be 1V-2.9V, and the vibration intensity grade corresponding to the second range may be the medium grade. A third range of the induced voltage amplitude can be 3-5V, and the vibration intensity grade corresponding to the third range may be the strong grade.

The setting module 200 further sets a detection function to activate the vibration sensor 10. In one embodiment, the setting module 200 may set a keystroke of a keyboard of the mobile device 1 to invoke the detection function. If a user wants to exercise while listening to the music, the user may hold the mobile device 1 and press the keystroke to activate/enable the vibration sensor 10.

Once the detection function invokes and the music player 40 is playing music, the activating module 202 activates the vibration sensor 10 detecting the vibration intensity of the mobile device 1.

The obtaining module 204 obtains an output induced voltage amplitude from the vibration sensor 10. In one embodiment, the obtaining module 204 may obtain the output induced voltage amplitude every 10 seconds.

The processing module 206 confirms a vibration intensity grade corresponding to the output induced voltage amplitude, and controls the music adjuster 30 to adjust the playing speed and the playing volume of the music player 40 according to the confirmed vibration intensity grade. In one embodiment, when the confirmed vibration intensity grade is weak, the processing module 206 controls the music adjuster 30 to increase the playing speed and the playing volume of the music player by 10%, to prompt the user to promote sport intensity (i.e., to move faster according to the music). If the confirmed vibration intensity grade is strong, the processing module 206 controls the music adjuster 30 to decrease the playing speed and the playing volume of the music player by 10%. If the confirmed vibration intensity grade is medium, the processing module 20 maintains the playing speed and the music volume.

The determination module 208 determines whether the music player 40 has been turned off.

The activating module 202 further disables the vibration sensor 10 to stop detecting the vibration intensity of the mobile device 1 when the music player 40 has been turned off.

Figure 3:
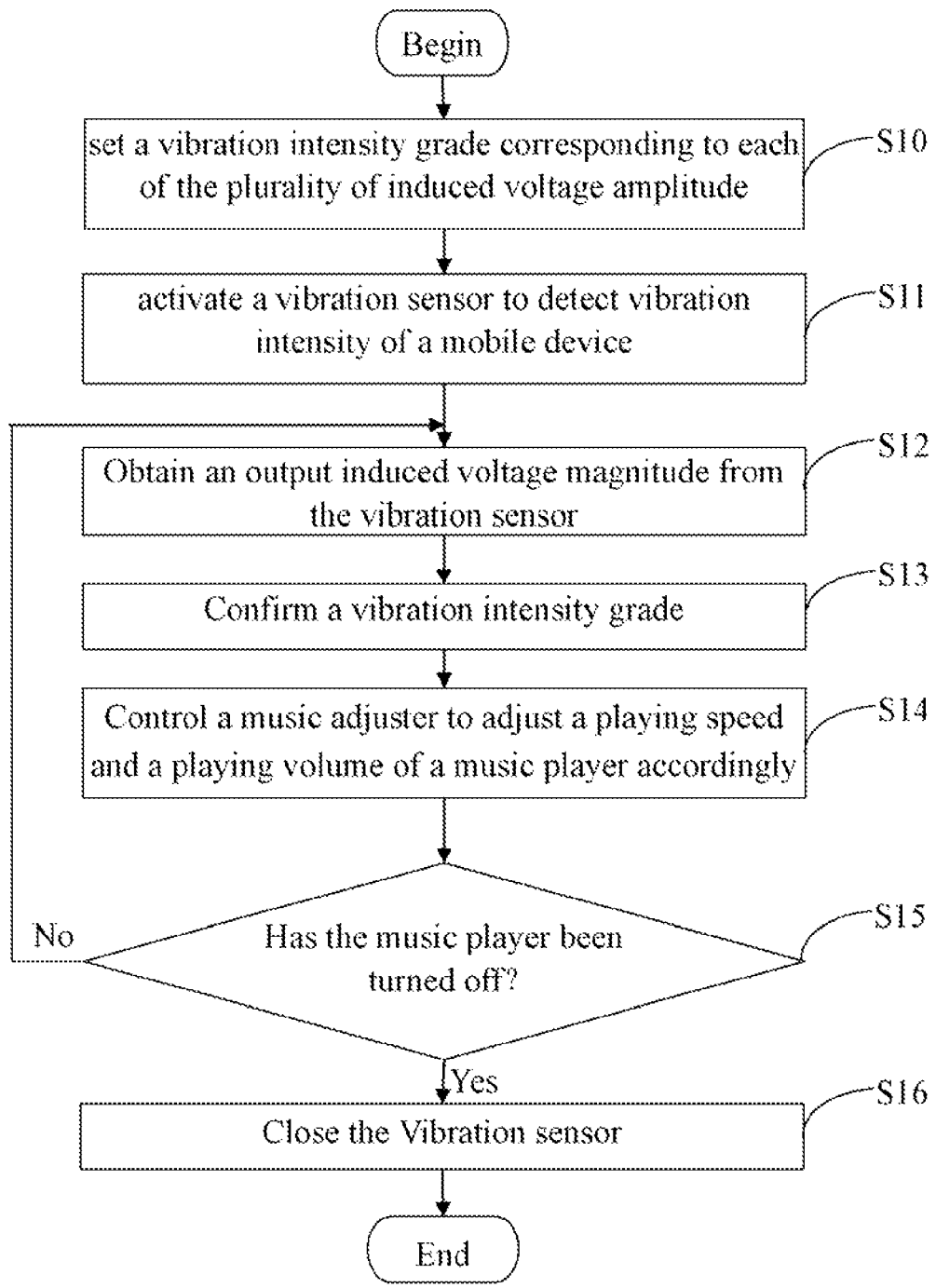
FIG. 3 is a flowchart of one embodiment of a method for helping exercise using the mobile device of FIG. 1.

FIG. 3 is a flowchart of one embodiment of a method for helping exercise using a mobile device of FIG. 1. Depending on the embodiment, additional blocks may be added, others removed, and the ordering of the blocks may be changed.

In block S10, the setting module 200 sets a plurality of induced voltage amplitudes of the vibration sensor 10, and sets the vibration intensity grade corresponding to the pluralities of induced voltage amplitudes, and the detection function to activate the vibration sensor 10. Depending on the embodiment, the vibration intensity grade may set to be three grades comprising of a weak grade, a medium grade, and a strong grade.

In block S11, when the detection function invokes and the music player 40 is playing music, the activating module 202 activates the vibration sensor 10 to detect the vibration intensity of the mobile device 1.

In block S12, the obtaining module 204 obtains the output induced voltage amplitude from the vibration sensor 10. Depending on one embodiment, the obtaining module 204 may obtain the output induced voltage amplitude every 10 seconds.

In block S13, the processing module 206 confirms a vibration intensity grade corresponding to the output induced voltage amplitude.

In block S14, the processing module 206 further controls the music adjuster 30 to adjust the playing speed and the playing volume of the music player 40 according to the confirmed vibration intensity grade.

In block S15, the determination module 208 determines whether the music player 40 has been turned off.

If the music player 40 has been turned off, in block S116, the activating module 202 further disables the vibration sensor 10 to stop sensing the vibration intensity of the mobile device 1 when the music player 40 has been turned off.

If the music player 40 has not been turned off, then the procedure turns to block S12.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be comprised herein within the scope of this disclosure and the above-described inventive embodiments, and the present disclosure is protected by the following claims.

What is claimed is:

1. A mobile device, comprising:
a vibration sensor;
a music player;
a music adjuster;
a setting module operable to set a plurality of induced voltage amplitudes of the vibration sensor, set a vibration intensity grade corresponding to each of the plurality of induced voltage amplitudes, and set a detection function to activate the vibration sensor, wherein the vibration intensity grades comprise a weak grade, a medium grade, and a strong grade;
an activating module operable to activate the vibration sensor to detect a vibration intensity of the mobile device when the detection function is invoked and the music player is playing music;
an obtaining module operable to obtain an output induced voltage amplitude from the vibration sensor;
a processing module operable to confirm a vibration intensity grade corresponding to the output induced voltage amplitude, and control the music adjuster to increase a playing speed and a playing volume of the music player by a predetermined percent if the confirmed vibration intensity grade is the weak grade, to decrease the playing speed and the playing volume of the music player by the predetermined percent if the confirmed vibration intensity grade is the strong grade, or to maintain the playing speed and playing volume of the music player if the confirmed vibration intensity grade is the medium grade.

2. The mobile device as claimed in claim 1, wherein the mobile device further comprises a determination module operable to determine whether the music player has been turned off.

3. The mobile device as claimed in claim 2, wherein the activating module is further operable to disable the vibration sensor when the music player has been turned off.

4. The mobile device as claimed in claim 1, wherein the predetermined percent is 10%.

5. A computer-implemented method of a mobile device, the method comprising:
setting a plurality of induced voltage amplitudes of a vibration sensor of the mobile device, and setting a vibration intensity grade corresponding to each of the plurality of induced voltage amplitudes, wherein the vibration intensity grades comprise a weak grade, a medium grade, and a strong grade;
set a detection function to activate the vibration sensor;
activating the vibration sensor to detect a vibration intensity of the mobile device when the detection function is invoked and the music player is playing music;
obtaining an output induced voltage amplitude from the vibration sensor;
confirming a vibration intensity grade corresponding to the output induced voltage amplitude,
controlling a music adjuster to increase a playing speed and a playing volume of the music player by a predetermined percent if the confirmed vibration intensity grade is the weak grade, to decrease the playing speed and the playing volume of the music player by the predetermined percent if the confirmed vibration intensity grade is the strong grade, or to maintain the playing speed and playing volume of the music player if the confirmed vibration intensity grade is the medium grade.

6. The method as claimed in claim 5, further comprising:
determining whether the music player has been turned off;
if the music player has not been turned off, returning to the step of obtaining the output induced voltage amplitude; or
if the music player has been turned off, disabling the vibration sensor.

7. The method as claimed in claim 5, wherein the predetermined percent is 10%.

8. A non-transitory storage medium storing a set of instructions, the set of instructions capable of being executed by a processor to perform a method of a mobile device, the method comprising:
setting a plurality of induced voltage amplitude of a vibration sensor of the mobile device, and set a vibration intensity grade corresponding to each of the plurality of induced voltage amplitude, and setting a detection function to activate the vibration sensor, wherein the vibration intensity grades comprise a weak grade, a medium grade, and a strong grade;

activating the vibration sensor to detect a vibration intensity of the mobile device when the detection function is invoked and the music player is playing music;

obtaining an output induced voltage amplitude from the vibration sensor;

confirming a vibration intensity grade corresponding to the output induced voltage amplitude;

controlling a music adjuster to increase a playing speed and a playing volume of the music player by a predetermined percent if the confirmed vibration intensity grade is the weak grade, to decrease the playing speed and the playing volume of the music player by the predetermined percent if the confirmed vibration intensity grade is the strong grade, or to maintain the playing speed and playing volume of the music player if the confirmed vibration intensity grade is the medium grade.

9. The non-transitory storage medium as claimed in claim 8, wherein the method further comprises:

determining whether the music player has been turned off;

if the music player has not been turned off, returning to the step of obtaining the output induced voltage amplitude; or if the music player has been turned off, disabling the vibration sensor.

10. The non-transitory storage medium as claimed in claim 8, wherein the predetermined percent is 10%.

* * * * *